Dec. 21, 1965   H. L. CUNNINGHAM   3,224,070
AUTOMATIC MACHINE TOOL CONTROL MECHANISM
Filed April 3, 1963   10 Sheets-Sheet 1
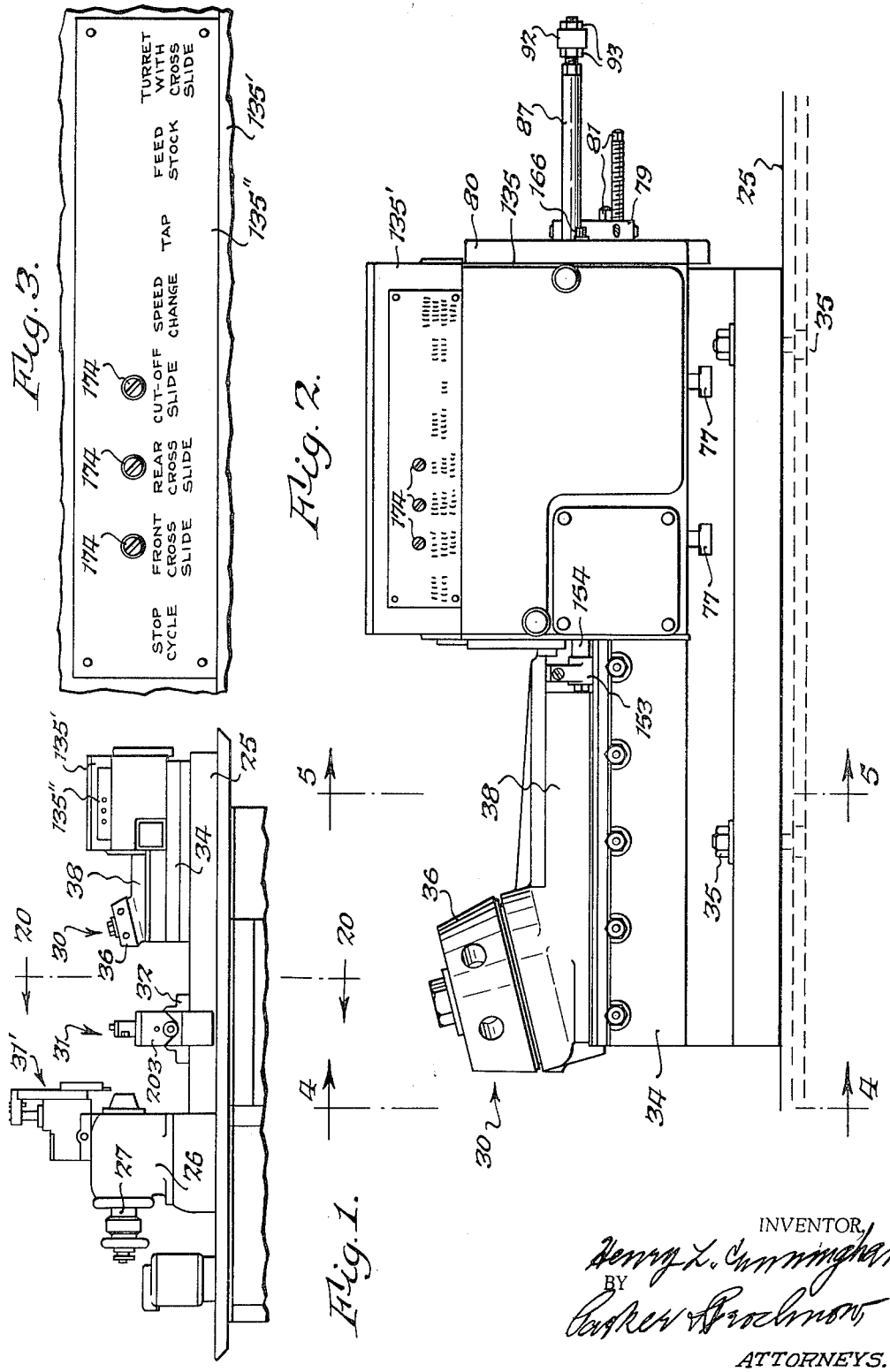
INVENTOR,
Henry L. Cunningham
BY
Parker Brockman
ATTORNEYS.

Dec. 21, 1965   H. L. CUNNINGHAM   3,224,070
AUTOMATIC MACHINE TOOL CONTROL MECHANISM
Filed April 3, 1963   10 Sheets-Sheet 2
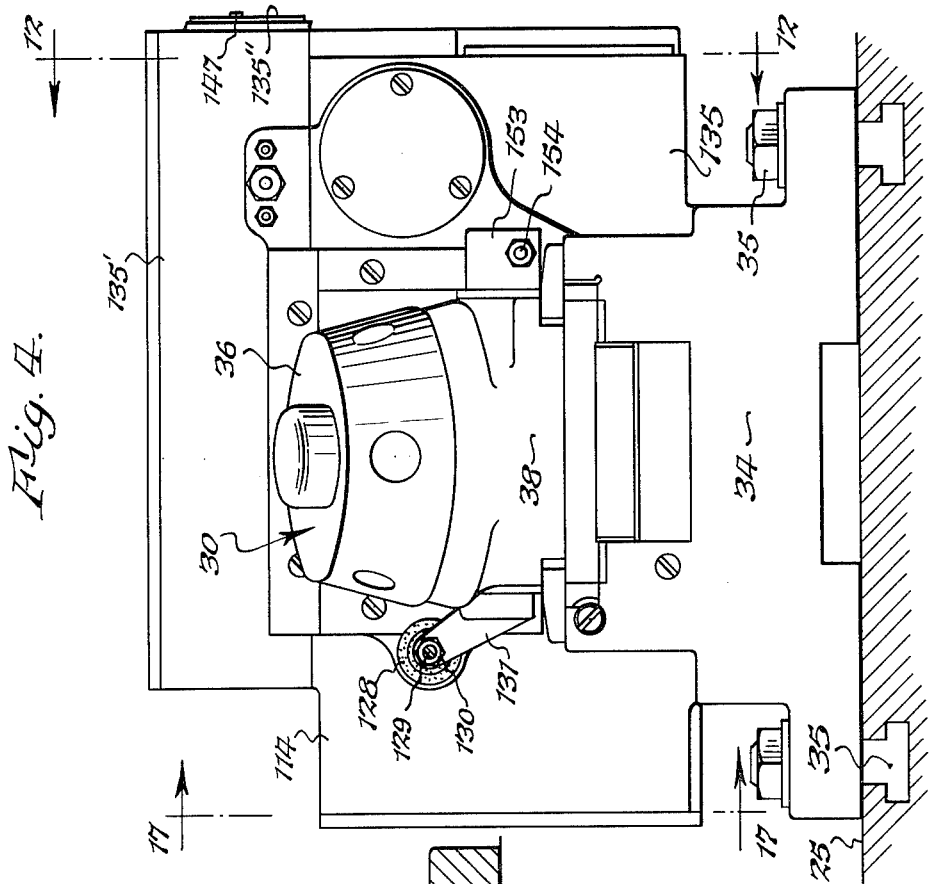
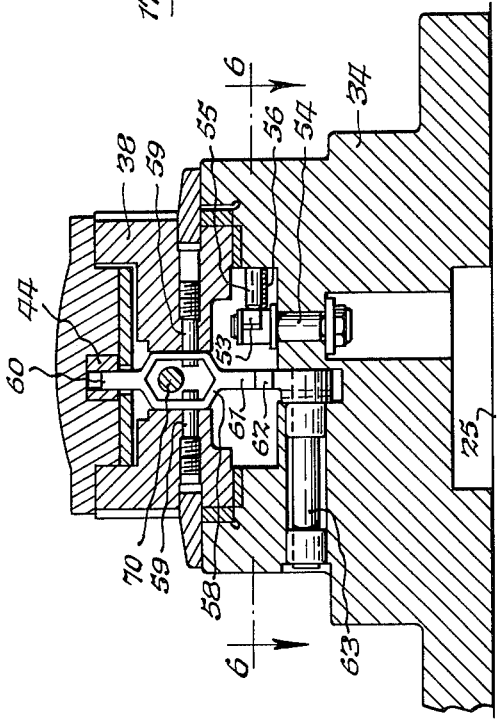
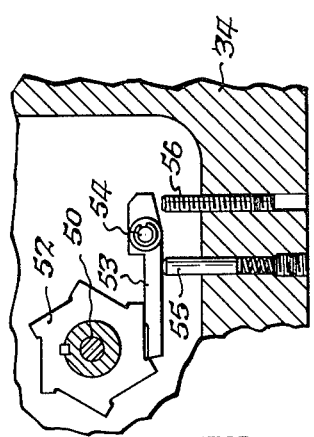
INVENTOR.
Henry L. Cunningham
BY
Parker Brockman
ATTORNEYS.

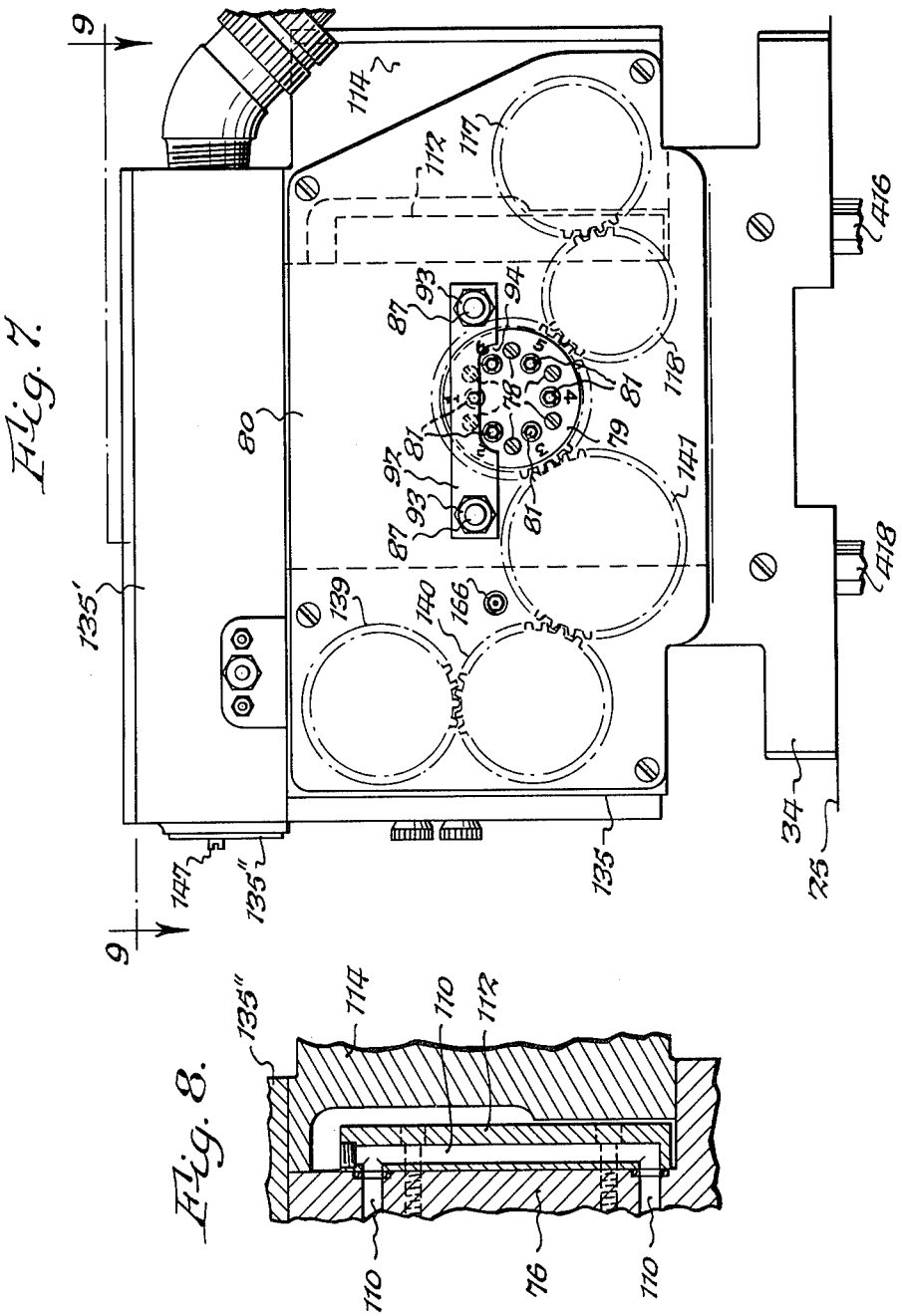

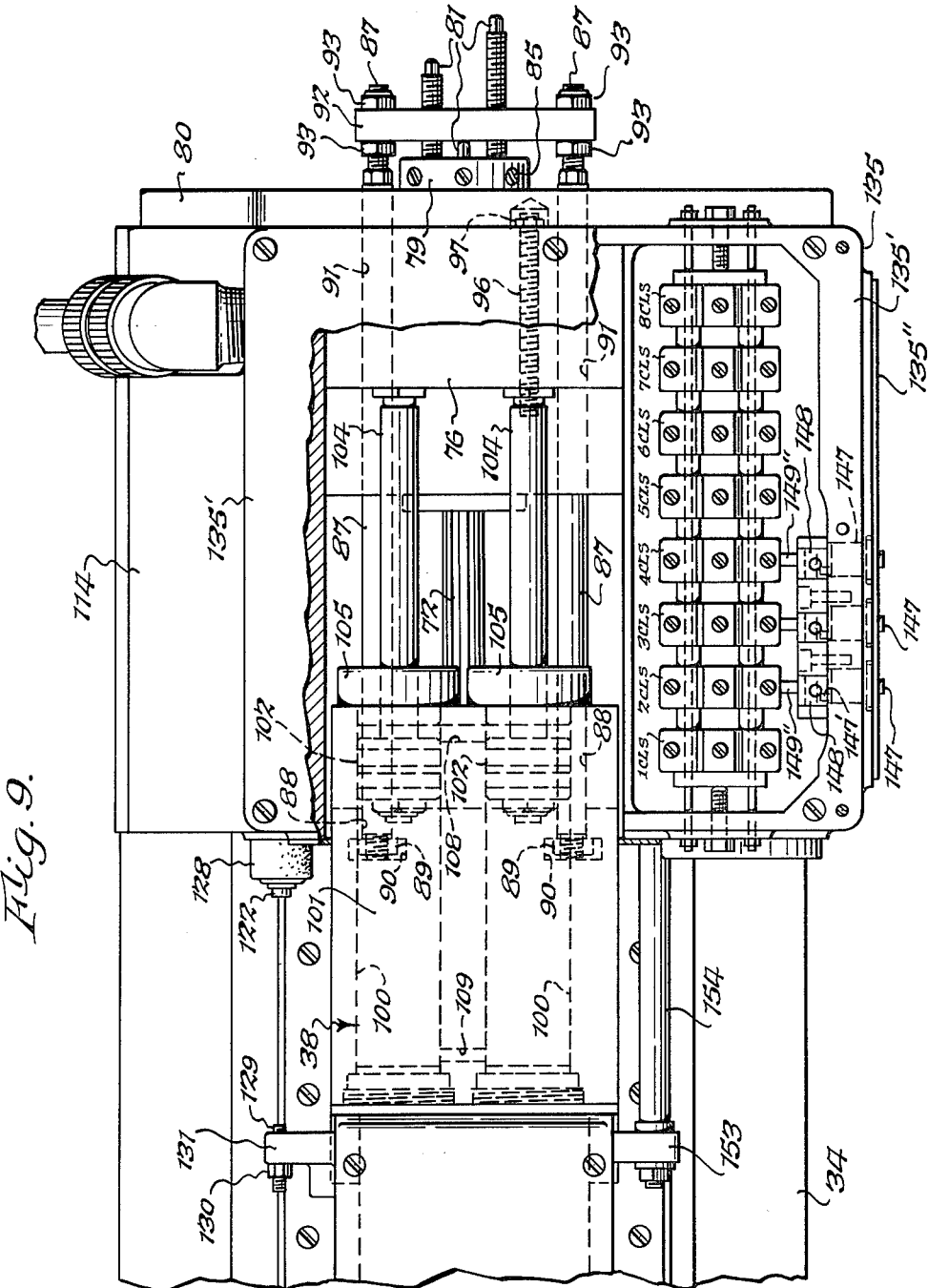

Dec. 21, 1965  H. L. CUNNINGHAM  3,224,070
AUTOMATIC MACHINE TOOL CONTROL MECHANISM
Filed April 3, 1963  10 Sheets-Sheet 5

INVENTOR.
Henry L. Cunningham
BY
Parker & Rochmon
ATTORNEYS.

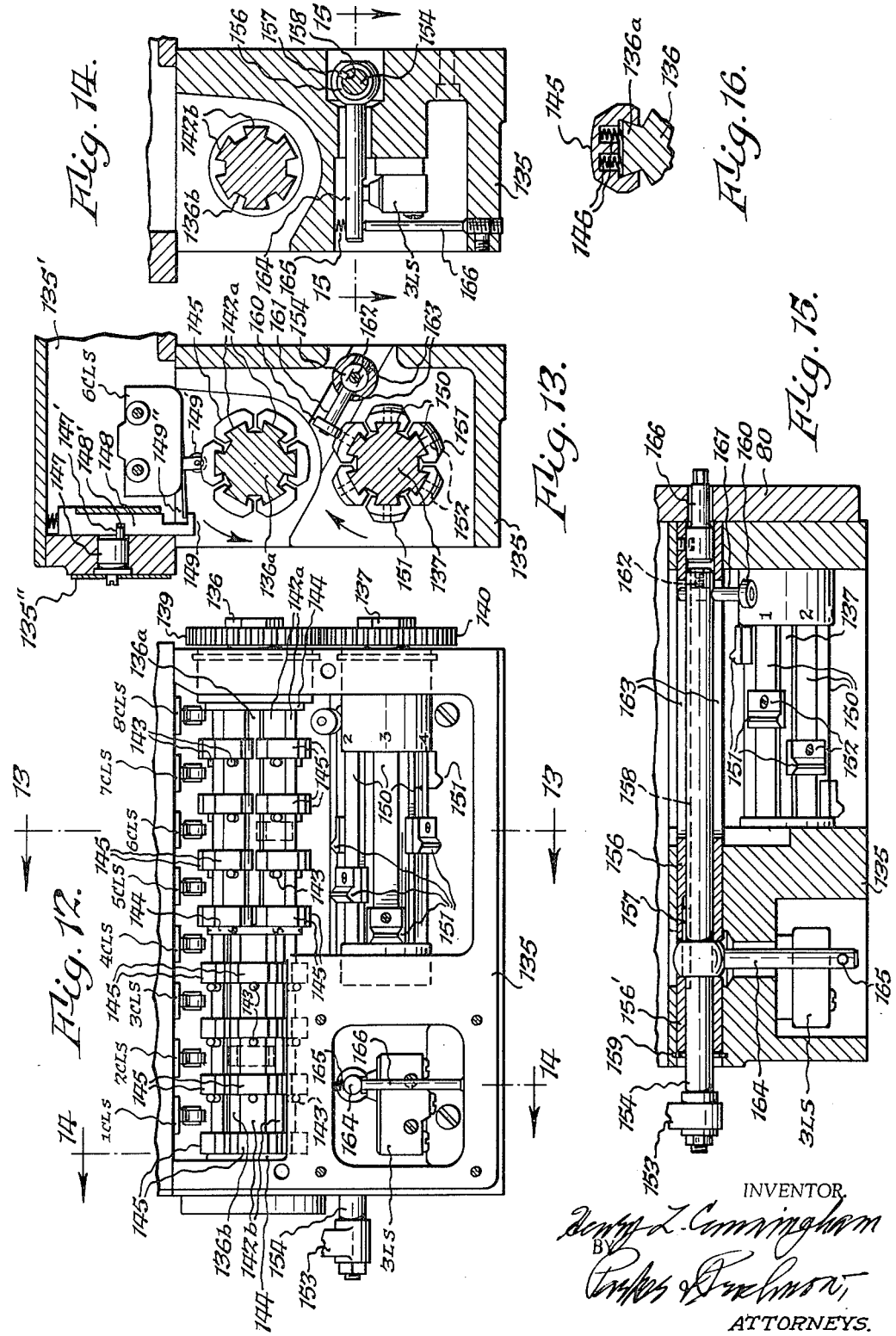

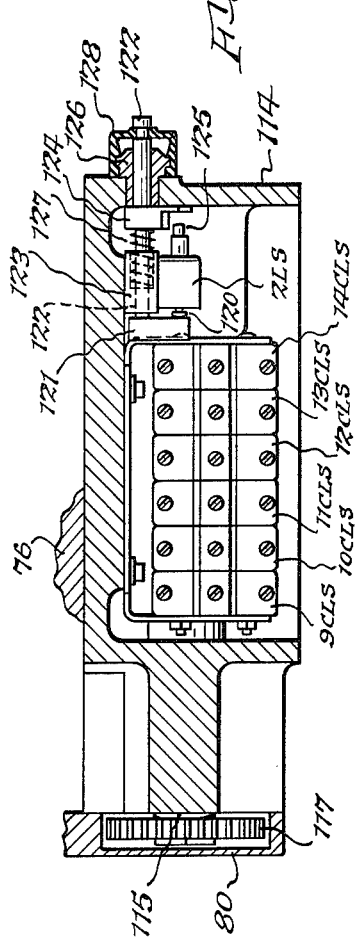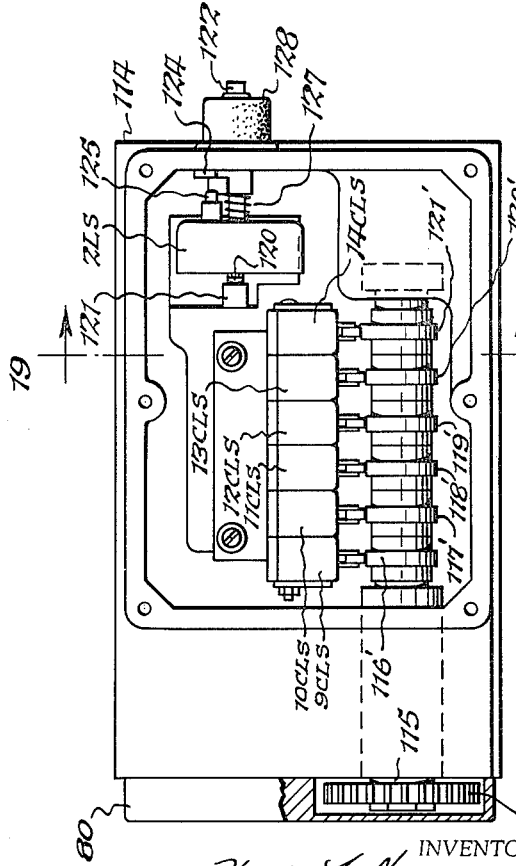

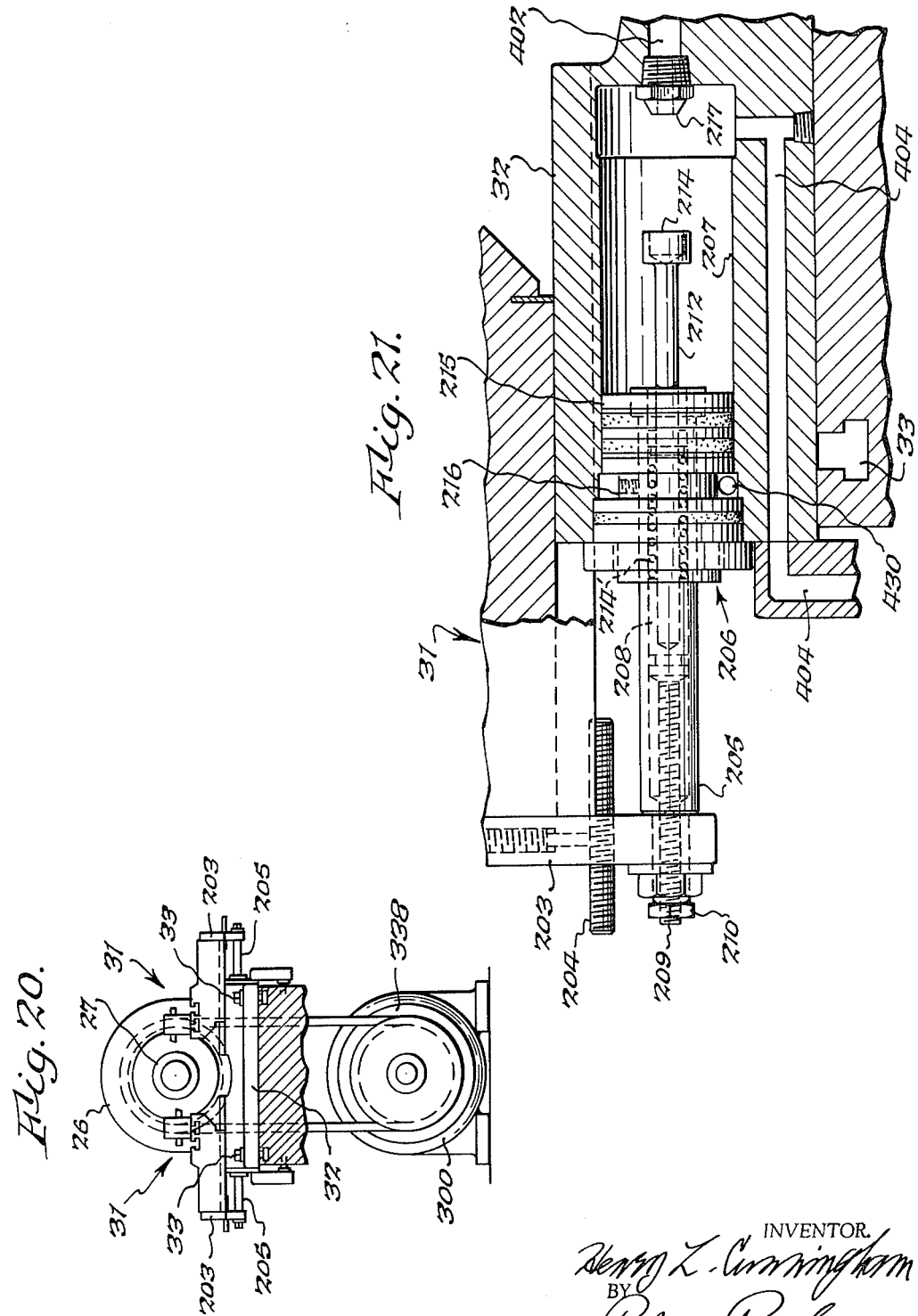

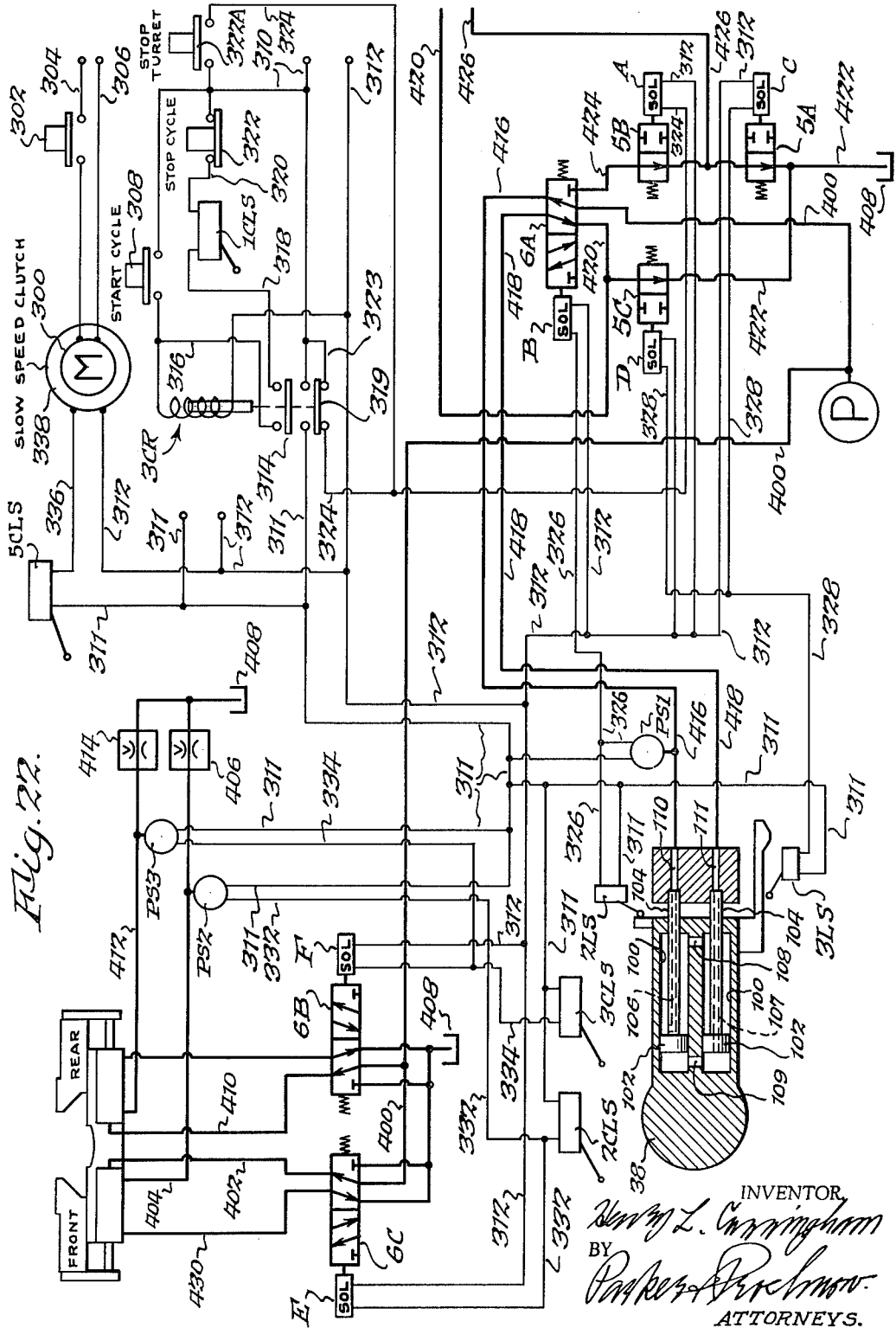

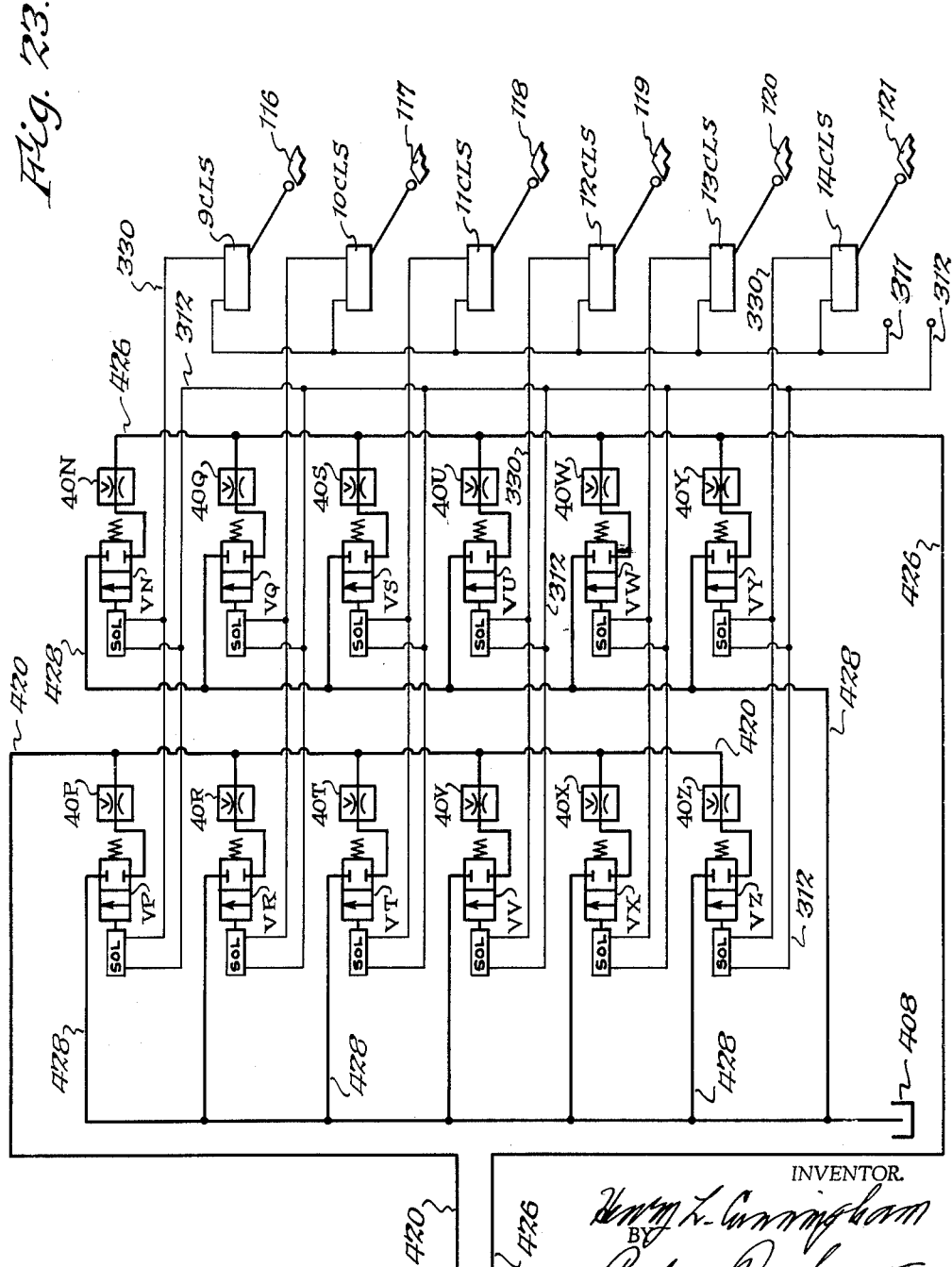

United States Patent Office 3,224,070
Patented Dec. 21, 1965

3,224,070
AUTOMATIC MACHINE TOOL CONTROL MECHANISM
Henry L. Cunningham, Horseheads, N.Y., assignor to Hardinge Brothers, Inc., Elmira, N.Y.
Filed Apr. 3, 1963, Ser. No. 270,430
7 Claims. (Cl. 29—42)

This invention relates to machine tools such, for example, as machine tools commonly referred to as "second operation machine" which are used to precision finish a workpiece after having been roughed out by previous operations on another machine. The invention however is useable on other types of machine tools.

More particularly this invention is concerned with machine tools which are machine-motivated hydraulically under electrical circuitry, this electrical circuitry being under the control of a mechanical programming arrangement which guides the machine through a cycle of operations which can be repeated any number of cycles desired, each cycle being completed automatically.

Another object is to provide a programming arrangement that can be easily changed to adapt itself to an infinite number of control operations.

Another object of this invention is to provide a machine which can be easily set up to follow a program of machine cutting operations, such as those performed by a turret slide, cross slide, or cutoff mechanism, as well as operations such as speed change or stock feed, which when once set up to perform these operations in a certain sequence will automatically repeat this cycle and produce identical finished parts until shut off.

Still another object is to provide a machine such as just described in which fast, traverse speeds are taken advantage of to save time, and as soon as the cutting tool is engaged with the work, precise cutting feed speeds take over to provide precision finish cuts.

A further object is to provide simplicity in the manner of programming a cycle, merely by the sliding of a cam into or out of the path of cam-controlled switches without the use of any tool.

A still further object is to provide hydraulic motivation of the cutting tools under the control of an electric circuit responsive to mechanically operated cams synchronized with the position of the cutting tool holders.

Another object is to provide a mechanism of this type which provides variable feeds for each cutting tool; also to provide a mechanism which may stop movement of a cutting tool at any part of its path of travel and which can also reverse the movement of a tool at any part of its path of travel.

In the accompanying drawings:

FIG. 1 is a side elevation of a typical machine tool to which this improved control mechanism of this invention has been applied.

FIG. 2 is an enlarged side elevation of the turret and programming portion of the machine made in accordance with this invention.

FIG. 3 is an enlarged, fragmentary face view of the function dial covering the auxiliary function switches.

FIG. 4 is a front elevation of the turret assembly taken along the line 4—4, FIG. 2.

FIG. 5 is a vertical, sectional view taken through the turret along line 5—5, FIG. 2.

FIG. 6 is a horizontal, fragmentary, sectional view taken along the line 6—6, FIG. 5.

FIG. 7 is a rear elevation of the turret programming housing.

FIG. 8 is a fragmentary section of an oil passage taken along the line 8—8, FIG. 10.

FIG. 9 is a top plan of the turret programming housing with part of the cover broken away.

FIG. 10 is a vertical, sectional view taken approximately along the center line axis of the turret and one of the actuating pistons and cylinder.

FIG. 11 is a horizontal, fragmentary plan of the turret index plunger.

FIG. 12 is a fragmentary side view of the turret programming housing similar to FIG. 2 with the side cover removed.

FIG. 13 is a fragmentary, vertical section taken along line 13—13, FIG. 12.

FIG. 14 is a fragmentary, vertical section taken along the line 14—14, FIG. 12.

FIG. 15 is a fragmentary, horizontal section taken along the line 15—15, FIG. 14.

FIG. 16 is an enlarged, fragmentary sectional detail of one of the slide cams shown in FIG. 13.

FIG. 17 is a fragmentary, horizontal section of the feed switches on the back side of the turret housing.

FIG. 18 is a side elevation of the feed switches and their actuating cams viewed from the back side of the machine and having the cover removed.

FIG. 19 is a vertical, sectional view of the feed switches and cams taken along the line 19—19, FIG. 18.

FIG. 20 is a vertical, sectional view through the machine along the line 20—20, FIG. 1, showing the spindle drive motor and electric clutch.

FIG. 21 is a vertical, sectional view showing a typical hydraulic power cylinder and piston for actuating a slide on the machine.

FIGS. 22 and 23 are simplified hydraulic and electrical diagrams typical for use in the operational control of this machine.

In FIG. 1 is illustrated a second operation machine having a bed or base 25 mounting a headstock 26 at one end. A spindle 27 is bearinged in the headstock to carry a chuck or other workpiece holding means such as a collet. At the other end of the base 25 is mounted a turret 30 and between the turret 30 and the headstock 26 is supported a pair of opposed cross slides 31. Mounted on the headstock 26 is also shown a cutoff slide 31'. As shown in FIGS. 1, 20 and 21, the cross slides 31 are guided crosswise of the machine upon a subbase 32 which is adjustably fastened to the machine bed 25 by means such as T bolt and slot connections 33.

The turret 30 is slidably mounted on a turret slide member 34 which in trun is fastened to the base 25 by T bolt and slot connections 35. This construction just described could also be in the form of standard lathe construction if desired having a headstock on a lathe bed having slidaways upon which both the cross slides and the turret slide are longitudinally movable.

The turret head 36 of the turret 30 is of the usual construction, being keyed to a central shaft 37, FIG. 10, and rotatably mounted in upper and lower bearings 40 and 41 and having an index ring 42. These bearings 40 and 41 are fitted into the turret slide 38. This index ring 42 has six radially displaced indexing slots 43 provided to receive an index plunger 44 which is biased by a spring 45 toward the index ring 42 locking it against rotational movement in any of six different radial positions. For each of these positions a tool-receiving socket 46 is provided, each of which has tool-clamping means 47, as is the usual practice.

The shaft 37 has fastened to its lower end a bevel gear 48 meshing with a companion gear 49 rotatable on a shaft 50. Bevel gear 49 also has integral therewith a miter gear 51 and a ratchet wheel 52. As will be seen in FIG. 6, the ratchet wheel 52 is engaged by a pawl 53 pivoted at 54 and biased by a spring loaded plunger 55 toward the ratchet wheel 52. On the other side of the pivot 54 is an adjustable stop screw 56 which restrains movement of the pawl 53 toward the wheel 52. Longitudinal movement of the turret slide 38 in relation to the turret guide 34 will cause the pawl 53 to rotate the ratchet wheel 52 one sixth revolution for every back and forth movement of the turret slide and consequently the turret head 36 and its cutting tools.

Means must be provided to disengage the index plunger 44 from the index ring 42 and for this purpose there is preferably provided a lever 58 pivoted at 59 having upper and lower extensions 60 and 61. A detent cam 62 pivoted on a shaft 63 having a flat face 64 is held in the position shown in FIG. 10 by a spring biased plunger 65 engaging the flat face 64. Since the shaft 64 is pivoted in the turret guide 34, it is stationary relative to the lever 58 pivoted on the turret slide 38 so that as the turret slide 38 moves to the left in FIG. 10, the plunger 44 cannot move into the index ring any further, the lever end 61 rotates the cam 62 about its shaft counterclockwise to clear the lever end 61 and let it pass by to the left. After passing by, the cam 62 returns to the position in FIG. 10 by the urging of its spring biased plunger 65. Upon reversal of the slide 38 to move to the right again, the lever end 61 is rotated clockwise about its pivot 59 causing retraction of the index plunger 44 out of one of the turret ring index slots 43 to permit the ratchet wheel 52 through its bevel gears 49, 48 to index the turret head 36 one-sixth turn to a new index position.

As soon as the index ring 42 has rotated an amount sufficient to keep the plunger 44 from going back into the index slot 43 from which it was withdrawn, lever end 61 will have passed over cam 62 allowing counter-clockwise rotation of end 61 around pivot 59. This allows plunger 44 to ride the outside diameter of the index ring 42, its spring 45 biasing it toward this ring until the next index slot 43 is in position, whereupon the plunger 44 enters the slot and precisely positions the index head 36.

At the same time that this occurs the miter gear 51 engaging another miter gear 68 suitably journalled in a bearing block 69 rotates a shaft 70 suitably journalled at 71 and connected to a splined shaft 72, which is in sliding engagement with a female spline 73 of a stop drum 74, see FIG. 10. A housing 76 is bored to rotatably support the stop drum 74 and is mounted to the stationary turret guide member 34 by means of T bolts and slots 77. Attached to the end of the stop drum 74 by cap screws 78, FIG. 7, is a gear 79 enclosed by a back plate or cover 80. Stop drum 74 has six equally spaced, tapped holes adapted to receive six turret slide stop screws 81, each one representing and associated with a certain position of a cutting tool of the turret head 36. Stop screws 81 are provided with set collars 82 at their inneer ends to prevent their complete removal from their threaded holes in the stop drum 74, these collars 82 being provided with clearance slots 84 in the stop drum 74 to permit their longitudinal adjustment. Lock screws 85 are provided to hold the adjustment of the stop screws 81. Looking at FIG. 9, it can be seen that the turret slide 38 is provided with a pair of rods 87 anchored to the turret slide 38 and loosely fitting in holes 88 with the rod ends threaded to square nuts 89, placed in milled slots 90. The rods 87 then pass through closely fitting holes 91 in the housing 76. The ends of the rods 87 are provided with a stop block 92 adjustably fastened thereto by nuts 93. As can be readily seen in FIG. 7, the stop block 92 has a cut-away portion 94 and is positioned in such a way that its horizontal center line will intersect only one of the stop screws 81 when in index position, the rest of the stop screws clearing the block 92 because of its cut-away 94. Thus as the turret slide 38 moves forwardly to perform a cut upon the workpiece turning on the spindle 27, the length of the cut will be determined by the adjustment of one of these stop screws. In other words, as each of six index positions comes up, the turret slide 38 can move toward the workpiece only to the position where the stop block 92, which is supported and movable with the turret slide 38, engages one of the stop screws 81 for this index position. The exposed end of the gear 79 has identifying numbers on its rear face so that the position of the index can be observed by the operator for setting up the machine, such as "1," "2," "3," "4," "5," "6."

Rearward stopping of the turret slide 38 is accomplished by an adjustable back stop screw 96 and a lock nut 97, as seen in FIG. 9. Once properly adjusted it remains so and therefore its slotted end is not exposed but covered by the back plate 80.

As best seen in FIGS. 9 and 10, a pair of hydraulic cylinders 100 are provided in a cylinder block 101 wherein pistons 102 are contained. Their piston rods 104 pass out through seal end heads 105 and are secured, liquid-tight, into the housing 76. The rods 104 are tubular to provide a liquid passage 106 to the back ends of the cylinders 100 and a liquid passage 107 to the head ends of the cylinders, the cylinders 100 being connected at the back end by a passage 108 and at their head end by a passage 109, as shown in FIG. 22. The passage 106 of one piston rod 104 through drilled passages 110 in the housing 76 and turret guide 34 connect with a hydraulic line 416 while the other passage 107 through drilled passages 111 in the housing 76 and turret guide 34 connect with the hydraulic line 418. As shown in FIG. 8, a manifold 112 is provided to take the passages 110 and 111 around and underneath the mechanism to the passages in the turret guide 34 to avoid mechanical interference of the hydraulic lines.

As will be seen in FIGS. 4, 7, 9, 17, 18 and 19, a feed cam and switch enclosure 114 is attached to the far side of the housing 76. A feed speed shaft 115 suitably journalled in the enclosure 114 has mounted thereon six single rise cams 116′, 117′, 118′, 119′, 120′ and 121′ which are radially displaced 60 degrees apart and successively actuate their companion cam switches 9CLS, 10CLS, 11CLS, 12CLS, 13CLS and 14CLS. Each cam and its companion switch represents a certain index position of the turret head 36 and is timed therewith by a gear 117 meshing with an idler 118 which in turn meshes with the gear 79 mounted on the stop drum 74, as illustrated in FIG. 7. Both the stop drum gear 79 and gear 117 have the same number of teeth so they rotate or step from one index to the next in unison through their idler gear connection.

The cam switches 9CLS–14CLS each actuates a pair of solenoid valves which in turn select a set of adjustable needle valves for each turret head position as listed below and in FIG. 23.

| Turret Position | Cam | Cam Switch | Solenoid Valve | Choke Valve | Solenoid Valve | Choke Valve |
|---|---|---|---|---|---|---|
| 1 | 116 | 9CLS | VN | 40N | VP | 40P |
| 2 | 117 | 10CLS | VQ | 40Q | VR | 40R |
| 3 | 118 | 11CLS | VS | 40S | VT | 40T |
| 4 | 119 | 12CLS | VU | 40U | VV | 40V |
| 5 | 120 | 13CLS | VW | 40W | VX | 40X |
| 6 | 121 | 14CLS | VY | 40Y | VZ | 40Z |

The adjustable choke valve 40N may be used to control forward cutting feed speed of the cutting tool mounted in the No. 1 position or index of the turret head 36 while 40P may be used to control return or rearward cutting feed speed of that same tool.

For example, if No. 1 index is used for tapping threads in a hole, adjustment of the needle of the choke valve 40N for in feed would be the same as the adjustment of the needle of 40P for the out feed. The hydraulic means to accomplish these operations will be explained later.

Also mounted in this enclosure is a limit switch 2LS of the reset type, i.e., a switch which holds when actuated and requires actuation of a release button to return it to normal. As shown in FIGS. 17 and 18, it is in its open position, and as will be seen, its reset button 120 is in engagement with a reset block 121 fastened on the end of a sliding rod 122 which is slidably mounted in a bearing 123. An actuator block 124 is also fixed on the rod 122 in position to engage the plunger 125 of the back stroke switch 2LS. A spring 127 urges the block 124 away from the plunger 125 while the reset block 121 depresses the reset button. This is its normal condition. The end of the rod 122 extends out of the enclosure 114 through suitable bearing sleeve 126 which carries a rubber boot protector 128.

As is clearly shown in FIG. 9, the rod 122 lies in the path of an adjustable screw 129 locked by a nut 130 on an arm extension 131 of the turret slide 38. The turret slide 38 in FIG. 9 is illustrated in its forward position and upon its return to the right the screw 129 will engage the slide rod end 122 and actuate the switch 2LS into its closed position. As will be explained later, closing of the switch 2LS causes actuation of a valve which through the hydraulic circuit will cause the turret slide 38 to again advance or move to the left in FIG. 9. The construction just explained with the reset means gives a time delay to allow pressure to build up in a pressure switch PS-1 to hold the valve 6A in forward position to prevent chatter of the turret slide 38 against the rear stop screw 96.

In FIGS. 4, 7, 9, 12, 13, 14 and 15 is shown a programming unit enclosure 135 mounted on the near side of the housing 76. This enclosure 135 rotatably supports an upper function selecting cam shaft 136 and a lower slow down positioning cam shaft 137. The cam shaft 136 has fixed to its ends a gear 139 while the cam shaft 137 has fixed to it another gear 140, both meshing with each other and each having the same number of teeth as the stop drum gear 79. An idler gear 141 serves as a driver between the stop drum gear 79 and the cam shaft gears 140. Thus they are kept in step with the indexing of the turret head 36 the same as explained for the cam shaft 115 with its gear 117.

The function selector shaft 136 is provided with a front section 136b and a rear section 136a each being angularly displaced 30 degrees from the other. Both shafts are milled to provide six equally spaced male dovetail slides 142a and 142b. Stop pins 143 are provided on all of these slides as well as stop collars 144 to limit the sliding movement of sliding cams 145. In all there are twenty-four sliding cams 145 on the shaft portion 136a and twenty-four cams 145 on the shaft portion 136b, giving a total of forty-eight. Directly above the cam shaft 136b are the cam switches 1CLS, 2CLS, 3CLS and 4CLS which when acted upon by the cams 145 on that portion will be momentarily closing switches, while those above the cam shaft 136a, the cam switches 5CLS, 6CLS, 7CLS and 8CLS, will be maintained closed when acted upon by their cams. As will be readily seen in FIG. 16, the cams 145 are machined to fit the dovetail configuration of 136a and 136b and have springs 146 which through their biasing action against the dovetail slide provide enough friction to prevent unintentional displacement from the position they are selectively placed in.

As mentioned before, the stop pins 143 and the stop collars 144 limit the positioning of the cams 145 on their dovetail slides. This is to permit positioning a cam into or out of the path of the cam switches 1CLS–8CLS just by sliding the cam one way or the other without the need of a tool.

It will now be seen that each of the cam switches 1CLS–8CLS has available to actuate it six cams 145, each cam representing a position of the index head 36, that can be moved into the path of that switch and actuate it at any one of the six index positions, the switches 1CLS, 2CLS, 3CLS and 4CLS being momentarily actuated while the switches 5CLS, 6CLS, 7CLS and 8CLS would be maintained closed. The momentary switches 1CLS–4CLS would be actuated while indexing is going on while the maintained switches 5CLS–8CLS would be actuated at the end of indexing, due to their relative angular displacement.

Whether momentary or maintained switches are used is immaterial since this would be dictated by the electrical circuitry used and the number of functions requiring one or the other type of cam switch.

In FIGS. 2, 3, 9 and 13 are shown manual means for operation of the cam switches 2CLS, 3CLS and 4CLS. Description of one will suffice for all since they are of identical construction and also only three are shown, but any of the cam switches 1CLS–8CLS could be provided with a manual control if desired.

Above the programming enclosure 135 is mounted the switch enclosure 135'. Eccentric bushings 147 are rotatably held in suitable openings in the switch enclosure 135' by a front indicia plate 135''. The eccentric bushings at their inside faces have an eccentric pin 147' engaging in a horizontal slot 148' of a switch slide member 148 which is mounted on the enclosure wall 135' in such a way that it can slide vertically and is spring loaded to keep it in a down position. The slide member 148 has at its lower end a finger 149 engaging a switch actuator in the form of cam roller 149' and an extension 149'' thereof. The exposed part of the eccentric bushing 147 is provided with a screw driver slot so that in setting up the machine the operator can trip any one of the three switches shown to initiate operation of that slide chosen.

As shown in FIGS. 13 and 15, the slow down positioning shaft 137 comprises similar male dovetail slides 150 which carry six adjustable cams 151 having set screws 152. These cams 151 are adjustable in a direction in line with the axis of the positioning shaft 137 and the horizontal movement of the slide 38. Each of the six cams 151 is timed as explained, by the gear 140 with the turret head 36 and represents one of the turret index positions. Connection to the slide 38 is provided through a lug 153 on the fore side of the slide 38 to which the left hand end of a slide rod 154 is rotatably secured. This rod 154 is slidably keyed to a tubular member 156 by a key 157, and a long spline 158. The tubular member 156 is journalled in the programming enclosure 135 and held against endwise movement by a split end ring 159, sleeve 156', switch lever 164 and the end cover 80. A roller 160 on a shaft 161 is set into the end of the slide rod 154 by a set screw 162, the shaft 161 being permitted to slide in the member 156 by means of a pair of slots 163. Thus, whenever the slide 38 moves toward or away from the workpiece, the roller 160 will follow this movement and engage one of the cams 151 in any of the six index positions. Engagement of the roller 160 with a cam 151 will cause the roller to be swung about the center of the shaft 154, the tubular member 156 rotating with it through its key and spline connection 157 and 158. This swinging action of the roller 160 is transmitted through the rod 154 and the key 157 to the switch lever 164 in engagement with a limit switch 3LS which is normally held open by a spring 165 biasing the lever 164 downwardly against a stop pin 166. The cams 151 can be set by their set screws 152 in any position along the dovetail slides 150 and as the roller 160 is moved by its connection with the turret slide 38, it will engage a cam and lift its arm 161 to close the switch 3LS for any one of the turret index positions, this permitting through circuitry yet to be explained, fast traverse of the turret 36 toward a workpiece and upon closure of the limit switch 3LS, which causes actuation of hydraulic valving to provide slow cutting feed speed, for proper finish of a cut, for any particular index position.

The tubular member 156 is provided with an extension 166 having a hexagonal end which projects beyond the cover 80 for manual use by the operator to put the turret in "feed" when setting up the machine.

A brief description of a typical cross slide 31, which could be a front, rear or cutoff slide, will now be given, this being the subject matter of a pending application bearing Serial No. 223,726 filed Sept. 14, 1962, the inventor being Henry L. Cunningham.

As shown in FIGS. 20 and 21, the cross slide 31 is suitably guided on its sub-base 32 and has a depending member 203 provided with a stop screw 204 to limit the forward movement of the slide 31 and its cutting tool. Also fixed to the depending member 203 is a piston rod 205 which passes through a seal 206 into a cylinder 207 in the sub-base 32. The piston rod 205 is hollow and adjustably retains a plunger adjusting member 208 having a threaded extension 209 threaded into the outer end of the piston rod 205 and having a lock nut 210. A poppet valve plunger 212 having a valve seat 214 is resiliently urged to the right by a spring 214' against a stop in the plunger adjusting member 208 and extends beyond the piston 215. A stop collar 216 limits the back stroke movement of the piston 215. At the head end of the cylinder 207 a valve bushing 217 is provided for seating with the valve seat 214.

Fluid pressure enters behind the piston 215 through the line 430 and moves the piston and slide 31 toward the work piece at traverse speed, fluid at the head of the piston flowing out through the lines 402 and 404. When the plunger valve seat 214 seals off the valve bushing 217, fluid then is restricted to flowing out of the line 404 which is under control of an adjustable restriction 406 to restrict the cutting feed speed of the tool on the slide 31 while taking its cut on the workpiece.

Up to this point this description has included mainly details of construction of the turret and its mechanical and hydraulic operable parts associated with electrical switches 1CLS–8CLS under the auxiliary functions which are the programming portion of this machine. Also the feed control switches 9CLS–14CLS which control the cutting speed both "forward" and "retract" of the turret slide 38. Also the slow down limit switch 3LS controlling the point of slow down of the slide 38 and the back stroke limit switch 2LS which reinitiates another stroke of the slide.

From the foregoing description it should be apparent that by proper setting up of the auxiliary function cams 145, the turret slide upon moving forward, doing its work upon the workpiece and returning, will index itself as well as index the function selection shaft 136, the slow down positioning shaft 137 and the feed speed shaft 115. Indexing of these shafts 136, 137 and 115 bring up the next set of functions for the machine to go through. The turret slide 38 will continue to index further functions on each back and forth movement until the "stop cycle" switch 1CLS is actuated, whereupon further work on the workpiece is brought to a stop.

If desired, since there are six index positions, the machine could be double or triple tooled. In the first case two sets of three different tools could be used to give operations on two workpieces successively. In the second case three sets of two different tools could be used to give operations on three workpieces during one revolution of the turret.

When a "speed change" is called for by a cam 145, actuating the cam switch 5CLS, its actuation will cause the electric clutch 338, see FIGS. 20 and 22, to be activated and to lower the spindle speed to low, there being in this case a normal high speed and the low speed available.

If tapping is called for, the cam switch 6CLS will be acted upon by a cam 145, whereupon a sequence of forward low speed, reverse and back to forward high speed will be initiated.

With the "feed stock" cam switch 7CLS actuated by a cam, initiation of a sequence takes place which will open the collet, feed stock through an air-operated bar feed against a turret stop and close the collet again. It of course must be assumed that the finished workpiece has been cut off before the previous operation ended.

When the "turret with cross slide switch" 8CLS is closed by a cam, if any or all of the cross slide functions have been selected, the turret and slides will start out together. Otherwise the turret will be held back until the slides have completed their cycle.

If the "stop cycle" cam is not set up to operate the switch 1CLS and the "cut-off" switch 4CLS is set up with the "feed stock" switch 7CLS, it will be seen that the machine would automatically continue to finish the workpieces and cut them off until all of the bar stock is consumed.

Since elaborate or less complicated circuits might be used with the invention thus far explained as well as "closed" switches instead of "open" switches, it is not to be assumed as a limitation when one or the other term is used in the following simplified hydraulic and electrical control circuits explanation.

*Operation of hydraulic and electrical control circuits*

The circuit diagrams shown in FIGS. 22 and 23 are simplified for ease of description and illustration and lack the elaborate interlock and fail safe relay complications which are generally incorporated in industrial equipment of this kind.

The condition of the parts and mechanism shown in these diagrams, FIGS. 22 and 23, are in their non-working or back positions. The front and rear cross slides 31, 31 are retracted away from the workpiece, the turret slide 38 is retracted and all of the hydraulic valves are in the positions that they assume when their solenoids are de-energized, being returned to this position by their return springs.

Assuming the proper cams have been set up for a particular cycle of operations the operator would start the spindle motor 300 by closing the motor switch 302 providing current to the motor 300 through the lines 304 and 306. The motor 300 is now running at high speed and the driven spindle 27 has in its chuck a workpiece. We will also assume that the hydraulic pump motor, not shown, has been energized and variable volume pump P is delivering hydraulic fluid under pressure. Fluid under pressure from pump P flows from the line 400 to the front cross slide valve 6C to line 402 holding its piston 215 in back position and returns through line 404, through choke valve 406 to sump 408, see FIGS. 21 and 22. Similarly fluid from line 400 flows to rear cross slide valve 6B to line 410 holding its piston 215 in back position and returns through line 412, choke valve 414 to sump 408.

Fluid also flows from line 400 to the valve 6A, to the line 416 through the tubular piston rod passage 106 and a port 108 into the back side of the cylinders 100, 100, which are connected by the cylinder port 108, thus holding the turret slide 38 in retracted position. The front side of the cylinders connected by the port 109 and hollow piston rod passage 107 are connected to the line 418, back to the valve 6A, to line 420. Line 420 connects to valve 5C, to line 422 to the sump 408. Line 420 also connects to a series of choke valves 40P, 40R, 40T, 40V, 40X and 40Z as shown in FIG. 23, the purpose of which will be later explained.

The start cycle switch 308 is then closed to provide current from the line 310 to the coil of the relay switch 3CR to the other side of the line 312.

Relay 3CR thus energized closes the holding contactor 314, connecting the line 310, through line 316, contacts of contactor 314, line 318, closed stop cycle cam switch 1CLS, line 320, closed stop cycle push switch 322 back to line 310, permitting release of start cycle switch 308 but still keeping relay 3CR energized. While the stop cycle cam switch 1CLS has been previously described as a momentary closing switch, since this circuit description and these diagrams of FIGS. 22 and 23 are simplified for ease of description, we will take the liberty to use the cam switch 1CLS in this instance as a maintained switch, normally closed and opened when engaged by a cam 145.

Contactor 319 now closing its upper contacts in the line 310 provides current to the line 311, while just previous to the relay 3CR being energized the contactor 319 was closing the lower contacts in the line 323 to the line 324 providing current to the solenoid A of the valve 5B and back to the line 312. Energization of this solenoid A had held the valve 5B in its shut off position which, as will be later explained, locked the turret from moving in either direction forward or backward.

Current now in the line 311 through the now closed limit switch 2LS passes to the line 326 to the solenoid B of the valve 6A, then back to the other side of the line 312, energizing the solenoid B and shifting the valve 6A to its other position. This position of the valve 6A passes oil under pressure from the line 400 to the line 418, hollow piston rod passage 107 to the front end of the cylinders 100, 100 of the turret slide 38 causing the turret to advance toward the workpiece. Exhausting oil in the line 416 causes pressure switch PS1 to close to hold the solenoid B energized since switch 2LS will open by its reset button 120 being actuated when turret moves away from it. Current from line 311 flows through now closed PS1 to the line 326 to solenoid B and then to the other side of the line 312, thus holding this solenoid in energized condition to cause the turret to continue advancing through position of valve 6A being held. Under this condition the turret will move forward in rapid traverse until the limit switch 3LS is actuated by one of the six adjustable feed cams 151 on the slow down positioning drum shaft (see FIG. 15).

In the case of this simplified description, let us assume that the switch 3LS is of the type whereupon the first time it is actuated by one of the cams 151 this will cause its contacts to close and then upon being actuated for the second time its contacts will again open.

Closing of switch 3LS passes current from the line 311 to line 328 to solenoids C and D and back to the other side of the line 312, thus energizing these solenoids C and D and causing their valves 5A and 5C to shift to their other positions. Shifting of the valve 5C to closed position blocks the line 420 from the line 422 and also to the previously mentioned choke valves 40P, 40R, 40T, 40V, 40X and 40Z. Shifting of the valve 5A blocks off the line 422 going to sump and causes exhaust oil, from the cylinders 100, 100 of the traversing turret, in the line 416 to flow through shifted valve 6A to line 424 through valve 5B still in the position shown in FIG. 22 to the line 426 which in FIG. 23 is shown connected to choke valves 40N, 40Q, 40S, 40U, 40W and 40Y.

Speed of forward movement of the turret slide 38 is now controlled by any one of the solenoid-operated, two-way valves N, Q, S, U, W or Y, depending upon which one is energized by its cam switch 9CLS, 10CLS, 11CLS, 12CLS, 13CLS or 14CLS.

These cam switches 9CLS–14CLS are actuated by the previously described cams 116', 117', 118', 119', 120' and 121' on the feed cam shaft 115, shown in FIGS. 17, 18 and 19, and are rotated into actuating position by this shaft and its geared connection to the turret tool in position at that instant. Therefore, for that particular cut or operation the proper cam will close that switch, for example, let us say 12CLS to provide current from the line 311, closed switch 12CLS, line 330, the solenoid of valve U and back to the other side of the line 312, thus energizing the solenoid and shifting the valve U to open position. Open valve U allows a flow of exhaust oil from the line 426 to flow through the choke valve 40U, through the open valve U to the sump line 428 and to the sump 408. The choke valve 40U of course has been adjusted to permit just the right flow of oil through it to give the turret slide 38 the corerct cutting feed speed.

It should be mentioned here that all of the choke valves 40N, 40Q, 40S, 40U, 40W, 40Y may be adjusted to give low to high feed cutting speeds while choke valves 40P, 40R, 40T, 40V, 40X and 40Z adjust the return or retract speed.

The turret thus will now advance and cut the workpiece at the proper speed for that particular type of work. When the turret movement is stopped by its stop screw 81, the pressure switch PS1 opens, opening the current supply to the solenoid B of the valve 6A, shifting this valve back to the position shown in FIG. 22, causing the turret to start to return to its retracted position shown in FIG. 22, whereupon it actuates the limit switch 3LS which opens the current supply to the solenoids C of valve 5A and D of valve 5C. While the turret slide 38 is returning back and the solenoid D is still energized with its valve 5C still closed blocking the line 420 from the line 422 and the sump 408, return or exhaust oil in the line 420 is made to pass through the choke 40V, which controls the speed at which the turret slide 38 will retract. The solenoid of the valve VV of course is energized and held open by the closure of the cam switch 12CLS which previously controlled the forward feed speed of the turret slide 38.

After valve 5C opens (when limit switch 3LS is again actuated during the retraction of the turret) the turret 38 will then rapidly traverse back because of fluid returning unimpeded directly to the sump 408, index and repeat a cycle. Since indexing takes place while the turret is traversing back a new stop screw 81 will be brought into position and a new cutting tool with of course a new position of cam settings on the feed shaft 115, auxiliary functions shaft 136 and the slow down positioning shaft 137. Since the turret has six positions for six different cutting tools, six different operations can be performed on the workpiece, each operation having its own forward traverse, depth of cut, feed speed, return speed feed and traverse set up to suit that particular individual operation.

If while setting up the machine it is desired that the cycle be stopped while the turret is in forward movement, selector switch 322A shown in FIG. 22 is closed which will energize solenoid A, which holds the valve 5B in its shutoff position, locking the turret in the desired position.

When the auxiliary functions cam 145 (see FIG. 12), which has been set up under the cam switch 1CLS comes up and opens it, which for this simplified description is now a normally closed switch, it will open the holding circuit to the relay 3CR and stop the machine at the end of any or all index stations of the turret, depending on how set up.

Up to this point consideration has only been given to the turret and how it is controlled. Operation of the front and rear slides will now be described.

Upon actuation, i.e. closing the cam switch 2CLS on the auxiliary functions shaft 136 by its cam 145, current will flow from the line 311 to the switch 2CLS, to line 332, to the solenoid E of the valve 6C and back to the other side of line 312, energizing it and shifting the valve 6C to the position opposite to that shown in FIG. 22. Fluid pressure from the line 400 then flows to the line 430 to the cylinder 207 behind the piston 215, and the front cross slide 31 starts to move forward. Exhaust fluid from the cylinder 207, line 404 actuates the pressure switch PS2 which holds the circuit to the solenoid E, providing it with current. Front slide 31 moves forward in rapid traverse until its adjustable internal poppet valve 214 closes the rapid traverse port 402, it then directs all exhaust fluid to the line 404, through the choke valve 406 and then to the sump pump 408. Forward feed speed is then under control of the choke valve 406 according to its adjustment. When the slide 31 is stopped by its stop screw 204, the exhaust pressure drops and pressure switch PS2 opens and the solenoid E is deenergized shifting the valve 6C to the position shown in FIG. 22, whereupon the front slide 31 will retract in rapid traverse to its back position.

The just explained operation of the front slide could also occur if desired when the machine operator would actuate the cam switch 2CLS by turning the manual eccentric actuator 147 with a screw driver, as illustrated in FIG. 3 and FIG. 13. Also shown in these figures are manual eccentric actuators 147 for the rear slide and for a cut off slide if used. The "cut off," "tap,"

"feed stock" and "turret with cross slide" features have not been shown in this disclosure since they would be similar in nature and duplications of the front and rear slides illustrated. These would be under the control of the cams and switches 6CLS, 7CLS and 8CLS shown in FIGS. 12–13. The "turret with cross slide" function when placed into operation with any one, two or all of the slide functions would initiate all of the slides called for simultaneously with the turret and would all start together, this being accomplished by circuitry not shown, only the initiating cam switch 8CLS being shown.

Operation of the rear slide 31 is similar to that just described for the front slide with the exception that it is brought into operation by the tripping of the cam switch 3CLS either by its cam 145 or manually by its eccentric actuator 147 closing it, to provide current from the line 311 to the line 334 to energize the solenoid F and shift the valve 6B to provide fluid pressure to move the rear slide forward as just explained for the front slide 31.

When it is found desirable to change the speed of the spindle from high speed to low speed during any one of the functions, one of the six speed change cams 145 on the auxiliary functions shaft 136 is moved into actuating position. When it actuates the speed change cam switch 5CLS as will be seen in FIG. 22, current then flows from line 311 through closed cam switch 5CLS, to line 336, slow speed clutch 338 and back to the other side of the line 312, energizing the clutch 338 to cause the spindle to run in low speed.

It will be understood that various changes in the details, materials and arrangement of parts which have been described herein and illustrated in order to explain the nature of the invention may be made by those skilled in the art within the principle and scope of the invention as expressed in the appended claims.

I claim:

1. A hydraulic device for moving a machine part at different selectable speeds which comprises:
   a pair of adjacent, closed, parallel cylinders carried by said machine part and each having an opening at one end thereof,
   a pair of fluid conduits connecting the interiors of said cylinders, one conduit connecting one end of said cylinders together, the other conduit connecting the opposite ends,
   a reciprocable piston in each of said cylinders,
   one of said pistons having a passage from face to face,
   a hollow piston rod carried by said one piston communicating with said passage and extending out of said cylinder through said opening,
   another hollow piston rod carried by the other of said pistons having a hole proximate said other piston into said cylinder and extending out of said cylinder through said opening,
   said piston rods having their free ends rigidly affixed against movement,
   a source of motive fluid,
   means for selectively admitting said motive fluid through one of said piston rods whereby when said fluid is admitted into one of said hollow rods said machine part will be moved in one direction while fluid is discharged from said another piston rod, and when admitted into said another piston rod and discharged from said one piston rod said machine part will be moved in the opposite direction,
   means for controlling the rate of discharge of said motive fluid.

2. A device for reciprocably moving a machine part relative to a fixed base at different selectable speeds which comprises:
   a source of motive fluid,
   a hydraulic piston drive means carrying said machine part, having a piston, a port on each side of its piston, said piston mounted for movement relative to said base in a direction dependent on which side of said piston motive fluid is admitted,
   a fluid sump,
   double acting valve means normally connecting said source with one of said ports and connecting the other of said ports with said sump, and having an activated position wherein said other port is connected with said source and said one port is connected with said sump,
   second valve means capable of selectively blocking and passing fluids interposed between said double acting valve means and said sump,
   a pair of discharge conduits connected to alternately receive said fluid from said double acting valve means when said second valve means are blocking,
   a sump conduit,
   a plurality of choke valve means capable of assuming a fluid blocking state and a restricted fluid passing state, interposed between said discharge conduits and said sump conduit,
   means for selectively causing one of said choke valve means to assume said passing state,
   whereby said machine part will be moved in a direction dependent on the position of said double acting valve means and at a speed dependent on the states of said second valve means and choke valve means.

3. The device according to claim 2 further including valves normally permitting the free passage of fluid between said control means and said sump and when activated diverting said fluid to said choke valve means, and, means for activating said valves.

4. The device according to claim 3 further including means for activating said double acting valve means includes:
   an electrical solenoid mechanically connected to activate said double acting valve means,
   a source of electrical energy,
   an electrical switch having normally open contacts except when said piston is positioned at one end of its travel,
   a pressure sensitive switch having normally open contacts except when sensing fluid pressure, said pressure switch connected to sense the fluid pressure discharged from said hydraulic drive means when said double acting valve means is activated whereby said pressure switch will de-energize its contacts when there is an absence of fluid pressure,
   a series electrical path having included therein said solenoid, said source of electrical energy and said electrical switch,
   said contacts of said pressure sensitive switch connected in parallel across said electrical switch contacts.

5. In a hydraulically motivated piston device for moving a machine part and having a pair of ports, one port on one side of its piston for movement in a forward direction when motive fluid from a source is introduced therein and discharged into a sump from the other port, said other port on the opposite side of said piston for rearward movement upon the introduction of motive fluid on said opposite side and discharge from said one port, an automatic controller which comprises:
   a pair of fluid conduits connected to said ports,
   a first solenoid activated valve normally passing fluid therethrough and when activated blocking the passage of fluid,
   a first fluid path having connected in series therein said first valve and said sump,
   a second solenoid activated valve normally passing fluid therethrough and when activated blocking the passage of fluid,
   a second fluid path having connected therein said second valve and said sump,
   a solenoid activated control valve normally connecting said source to one of said pair of fluid conduits and the other of said pair of fluid conduits to said first fluid path, and when activated connecting said source to the other of said fluid conduits and said one of said fluid conduits to said second path, means selectively restricting the passage of fluid and diverting said fluid directly to said sump thereby by-passing said first and second paths when said solenoid valves are activated, pressure sensitive mean connected to activate said control valve when fluid pressure ceases to exist in one of said pairs of fluid conduits, switch means for activating said first and second solenoid activated valves when said machine part has advanced to a selected point along its forward end rearward excursion, whereby said piston device will move rapidly in one direction and upon activation by said switch means will proceed at a speed dependent on said fluid restricting means, reach the end of its travel whereupon said fluid pressure in said one of said conduit pairs will cease and said control valve will return to its normal position and cause movement of said piston in the opposite direction.

6. The controller according to claim 5 wherein said means selectively restricting fluid passage is a plurality of solenoid controlled cam actuated choke valves and cams carried by said machine part operative coupled with said choke valves.

7. An automatic controller for a hydraulic piston device which moves a machine part at a speed dependent on the rate of discharge of fluid therefrom which comprises:

a discharge conduit connected to receive the fluid discharged from said device, a sump conduit, choke valve means capable of assuming a fluid blocking state and a restricted fluid passing state including:

a fluid valve having an inlet and outlet port, a movable element disposed therebetween capable in one position of blocking passage of fluid therebetween and in the other position allowing the unrestricted passage of fluid therebetween, biasing means connected thereto for biasing said valve into said one position, an electrical solenoid connected to said valve for moving said element, when activated, into said other position, a choke valve connected in series with one of said ports, a source of electrical energy, a switch for selectively supplying electrical energy to said solenoid for causing activation of said solenoid, said choke valve means connected between said discharge and sump conduits whereby the speed of said part may be controlled by selectively changing the state of said choke valve means.

References Cited by the Examiner

UNITED STATES PATENTS

| 1,909,166 | 5/1933 | Burrell | 29—42 |
| 2,148,348 | 2/1939 | Groene | 82—21.1 |
| 2,357,514 | 9/1944 | Hunnekens | 29—42 |
| 2,379,123 | 6/1945 | Wantz | 29—44 |
| 2,642,649 | 6/1953 | Shadrick | 29—42 |

RICHARD H. EANES, JR., *Primary Examiner.*